(12) United States Patent
Kashani et al.

(10) Patent No.: US 12,406,050 B2
(45) Date of Patent: Sep. 2, 2025

(54) METHOD AND SYSTEM FOR DIAGNOSTIC SERVICES WITH REMOTE ATTESTATION

(71) Applicant: DENSO CORPORATION, Kariya (JP)

(72) Inventors: Ameer Kashani, Southfield, MI (US); Carlos Mora-Golding, Southfield, MI (US); Tomonori Ikuse, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 18/402,354

(22) Filed: Jan. 2, 2024

(65) Prior Publication Data
US 2025/0217469 A1    Jul. 3, 2025

(51) Int. Cl.
*G06F 21/44*    (2013.01)
(52) U.S. Cl.
CPC ................... *G06F 21/44* (2013.01)
(58) Field of Classification Search
CPC ........................................................... G06F 21/44
See application file for complete search history.

(56) References Cited

U.S. PATENT DOCUMENTS

| | | | |
|---|---|---|---|
| 7,228,420 | B2 | 6/2007 | Dabbish et al. |
| 9,460,567 | B2 | 10/2016 | Huang |
| 2018/0254903 | A1 | 9/2018 | Bardelski et al. |
| 2020/0314089 | A1* | 10/2020 | Iasynetskyi ............. G06F 21/33 |
| 2021/0075783 | A1* | 3/2021 | Mazzara, Jr. ...... G07C 9/00174 |
| 2023/0013452 | A1* | 1/2023 | Alam ................... G08G 1/0129 |

OTHER PUBLICATIONS

"A Balanced Approach for Securing the OBD-II Port," Markham et al., Honeywell International Inc., dated Mar. 28, 2017.

* cited by examiner

*Primary Examiner* — Brian Whipple
(74) *Attorney, Agent, or Firm* — Harness, Dickey & Pierce, P.L.C.

(57) ABSTRACT

A method of authenticating a host electronic device in communication with a vehicle is provided. The method includes receiving, from the host electronic device, credential information to authenticate an identification of the host electronic device, prior to allowing access to secure data to control one or more functions of a vehicle. The credential information includes a first attestation profile that defines at least one of software components and parameters associated with the software components to be used to provide an attestation between a client device and the host electronic device, during the diagnostic session after the host electronic device has been authenticated. The method includes terminating the diagnostic session with the host electronic device based on a failed verification of the received measurement.

20 Claims, 8 Drawing Sheets

METHOD AND SYSTEM FOR DIAGNOSTIC SERVICES WITH REMOTE ATTESTATION

FIELD

The present disclosure relates to methods and systems for diagnostic services and more specifically to methods and systems for diagnostic services with remote attestation.

BACKGROUND

This section provides background information related to the present disclosure which is not necessarily prior art.

In general, vehicle diagnostic tools (VDTs) use diagnostic services to establish access with electronic control modules (ECMs) of a vehicle using a diagnostic protocol. ECMs are embedded in a vehicle system and control a specific vehicle feature and/or function. This access to the ECMs allows the VDTs to provide a specific service such as read and/or clear diagnostic trouble codes (DTC) for troubleshooting vehicle issues, extracting parameter data values (e.g., temperature, state of charge, vehicle identification numbers (VIN), initiating diagnostic sessions (e.g., testing safety-critical features), and/or modifying ECM behavior (e.g., resets, firmware flashing and setting modification)).

During an initiation of a diagnostic session, a VDT is connected to a vehicle's bus and communicates with an ECM. Upon receiving a request for connection, the ECM may provide a challenge to the tester and the tester, in turn, calculates and provides a challenge response or session key to the ECM (a key to allow access to the ECM). If the session keys match, the diagnostic session is established. If they do not match, the communication is dropped, and no diagnostics session is established. During this exchange in communication, however, a malicious hacker may eavesdrop and learn the correct challenge response or session key. This information can then be used to acquire the sensitive or confidential information stored in the ECM. Learning the correct challenge response could allow the hacker to acquire physical access to the vehicle and even harm a lawful user of the vehicle including remotely starting a vehicle, unlocking a vehicle's doors, flashing lights, turning on/off the vehicle's heating and cooling system, turning the front wheels, changing the speed shown on a speedometer, etc.

SUMMARY

This section provides a general summary of the disclosure and is not a comprehensive disclosure of its full scope or all of its features.

In one aspect, the present disclosure includes a method of authenticating a host electronic device in communication with a vehicle. The method includes receiving, from the host electronic device, a public key certificate to authenticate an identification of the host electronic device prior to allowing access to secure data to control one or more functions of a vehicle. The credential information includes a first attestation profile, and the first attestation profile defines at least one of one or more software components and one or more parameters associated with the one or more software components to be used to provide an attestation of a client device in communication with the host electronic device during a diagnostic session. The method includes verifying whether a received measurement of the at least one of the one or more software components and the one or more parameters of the first attestation profile is valid. The received measurement is transmitted by the host electronic device that has been authenticated. The method includes terminating the diagnostic session with the host electronic device based on a failed validation of the received measurement.

In at least one form, the client device is an electronic control module of the vehicle.

In some forms, the host electronic device is a vehicle diagnostic tool.

In one form, the verifying is performed in a trusted execution environment.

In another form, the method further includes receiving a request to start the diagnostic session with authentication.

In some forms, the method further includes verifying whether the credential information is valid, and transmitting a challenge-response token that asks the host electronic device to sign the challenge-response token with a private key certificate that identifies its issuer.

In still another form, the method further includes issuing an acknowledgment of establishing a successful authentication for the diagnostic session based on a valid signature of the private key certificate.

In yet another form, the verifying whether a received measurement having the at least one of the one or more software components and the one or more parameters of the first attestation profile is valid includes determining whether the received measurement is valid based on a second attestation profile stored in the host electronic device and the second attestation profile having an identical copy of the at least one of one or more software component and parameters corresponding to the identical copy of the at least one or more software components.

In one form, the one or more parameters includes at least one of: a trigger parameter that defines when to perform the measurement, a verifier parameter that defines whether the host electronic device or an electronic control module of the vehicle determines the measurement, a memory range parameter that defines a memory range including an address and an offset/size of a region starting at the address, and an expected value parameter that includes one or more values that correspond to different versions of acceptable software.

In another form, the method further includes logging an event based on a termination of the diagnostic session due to the received measurement being verified as invalid.

In still another form, the credential information further includes a public key and a digital signature of a certificate authority.

In yet another form, the received measurement includes one or more parameters to provide continuous authentication of a previously authenticated component to provide communication.

In one form, the received measurement includes a software component to be authenticated and an expected value parameter associated with the software component.

In one form, the received measurement has been encrypted by the host electronic device, and the method further includes verifying the received measurement using at least one of a seed or a nonce associated with the first attestation profile.

In one aspect, the present disclosure provides an electronic control module of a vehicle. The electronic control module includes a processor and one or more non-volatile memory devices configured to store instructions executed by the processor. The instructions, when executed by the processor, are configured to perform receiving, from a host electronic device in communication with the electronic module for a diagnostic session, a credential information to authenticate an identification of the host electronic device prior to allowing access to secure data to control one or more functions of a vehicle. The credential information includes a first attestation profile, and the first attestation profile defines at least one of one or more components and parameters associated with the one or more components to be used to provide an attestation of the electronic control module during the diagnostic session after the host electronic device has been authenticated. The instructions include verifying whether a received measurement having the at least one of one or more software components and the one or more parameters of the first attestation profile is valid. The received measurement is transmitted by the host electronic device that has been authenticated. The instructions include terminating the diagnostic session with the host electronic device based on a failed validation of the received measurement.

In one form, the received measurement includes one or more parameters to provide continuous attestation once the host electronic device has been authenticated.

In another form, the received measurement includes a software component to be authenticated and an expected value parameter associated with the software component.

In still another form, the verifying is performed in a trusted execution environment.

In yet still another form, the attestation profile further includes one or more attestation requirements, and the instructions further include transmitting a measurement of the one of the at least one of a software component and a parameter of the attestation profile based on the one or more attestation requirements.

In one aspect, the present disclosure provides a system for vehicle diagnostic services with remote attestation. The system includes a vehicle diagnostic tool and an electronic control module. The vehicle diagnostic tool includes a processor and one or more non-transitory computer-readable medium comprising instructions that, when executed by the processor, cause the processor to perform transmitting a request for a diagnostic session, wherein the request includes credential information to authenticate an identification of the vehicle diagnostic tool. The credential information includes a first attestation profile, and the first attestation profile defines at least one of one or more components and parameters associated with the one or more components to be used to provide an attestation during the diagnostic session after the host electronic device has been authenticated. The electronic control module is electrically coupled and in communication with the vehicle diagnostic tool. The vehicle diagnostic tool includes a processor; and one or more non-transitory computer-readable medium comprising instructions that, when executed by the processor, cause the processor to perform receiving, from the vehicle diagnostic tool, the credential information to authenticate the identification of the vehicle diagnostic tool to establish the diagnostic session, prior to allowing access to secure data to control one or more functions of a vehicle. The first attestation profile is defined to provide the attestation between the electronic control module and the vehicle diagnostic tool during the diagnostic session after the vehicle diagnostic tool has been authenticated. The instructions, when executed by the processor cause the processor to perform verifying whether a received measurement having the at least one of the one or more software components and the one or more parameters of the first attestation profile is valid and terminating the diagnostic session with the vehicle diagnostic tool based on a failed validation of the received measurement for authenticating the vehicle diagnostic tool in communication with the electronic control module. The vehicle diagnostic tool is configured to perform one or more diagnostic operations on the electronic control module during the diagnostic session.

In one form, verifying whether a received measurement of the at least one of one or more software components and one or more parameters of the first attestation profile is valid comprises determining whether the received measurement based on a measurement of a second attestation profile that is stored in a trusted execution environment of the host electronic device.

In another form, the received measurement includes one or more parameters to provide continuous authentication of an authenticated vehicle diagnostic tool that allows the diagnostic session to continue being active.

In yet another form, the one or more parameters includes at least one of a trigger value, a verifier, a memory range, and at least one expected value.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure provides methods and systems for diagnostic services with remote attestation. In one form, a method and a system protect sensitive information carried by and stored within a client device (i.e., an electronic control module (ECM)) of a vehicle from malicious attackers. The present disclosure enables electronic devices (e.g., ECMs and/or vehicle diagnostic testers (VDT)) associated with a vehicle to determine whether a connecting device is authentic and valid to prevent a malicious attacker from accessing one or more features/functions of an ECM of a vehicle.

In some respects, the systems and the methods of the present disclosure advantageously provide a unique attestation profile that is defined by a manufacturer of an ECM and/or a VDT and is included in credential information used for diagnostic access.

Other benefits of the systems and methods of the present disclosure include establishing high levels of assurance in diagnostic services by defining an isolated/trusted system that hooks into a diagnostic session sequence, and uses additional metadata integrated in an ECM and/or VDT.

Figure 1:
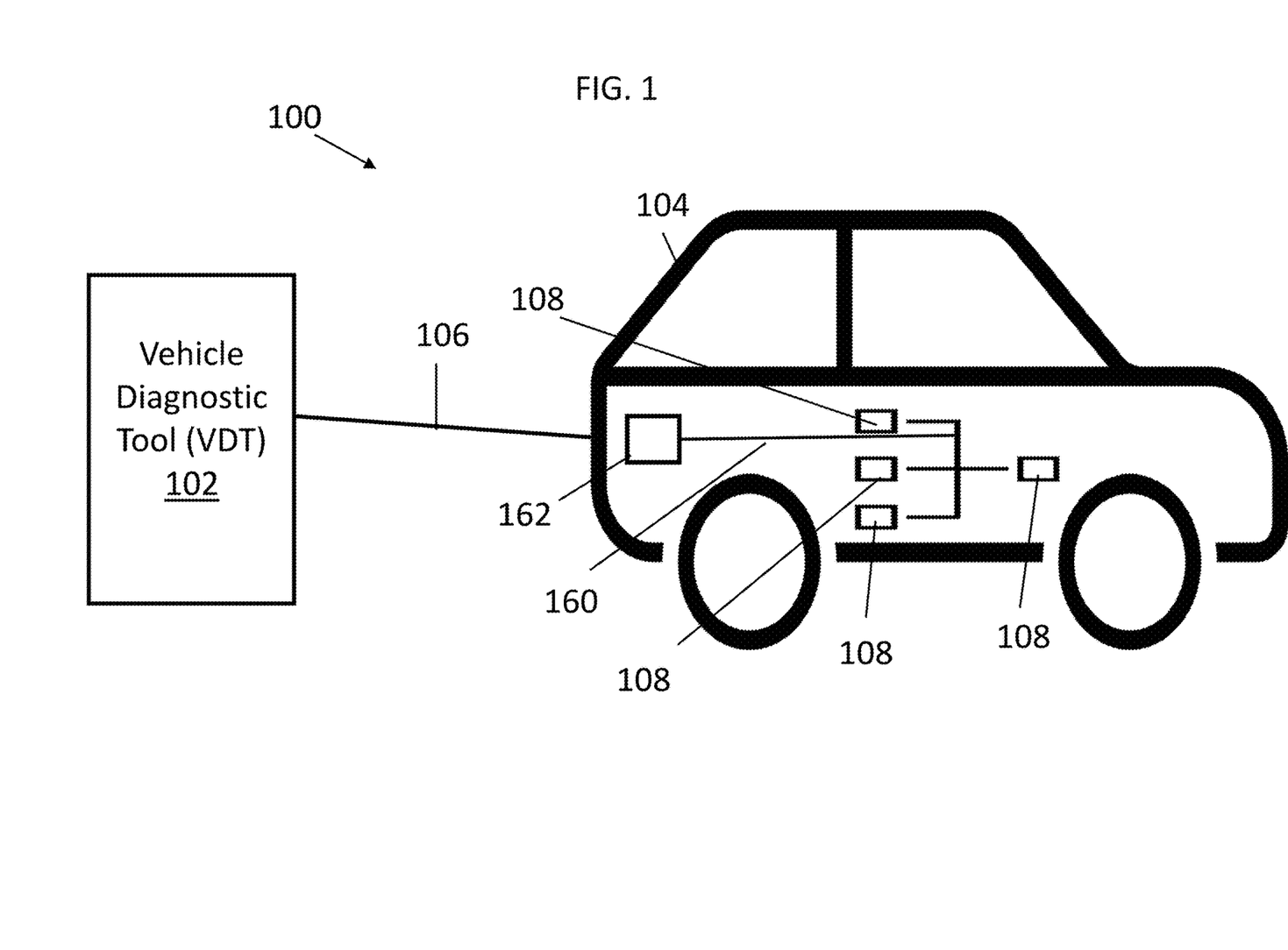
FIG. 1 is an illustrative diagram of a system according to the present disclosure.

Referring to FIG. 1, a system 100 for vehicle diagnostics with remote attestation is provided. The system 100 includes a VDT 102 in communication with a vehicle 104 to conduct a diagnostic session. The vehicle 104 includes a plurality of electronic control modules (ECMs) 108. The ECMs 108 will be further discussed in detail later. It should be noted that while a vehicle example is provided, the present disclosure is also applicable to non-vehicle implementations.

The VDT 102 may be directly or wirelessly coupled to the vehicle 104. For example, the VDT 102 may be directly coupled to the vehicle 104 via a connector 106 (e.g., an on-board diagnostic (OBD) 2 connector) of the vehicle 104. In another example, the VDT 102 may be wirelessly coupled to the vehicle 104 via an internet connection or cellular connection (not shown). As provided herein, remote attestation is a method by which the vehicle 104 and/or the VDT 102 continues to authenticate hardware and software configurations of a connecting device, (e.g., the VDT 102 or the vehicle 104, respectively) during a diagnostic session. The VDT 102 and the vehicle 104 will be further discussed below.

The VDT 102 includes one or more processing devices or processors and memory or memory devices. Processing devices and memory are further disclosed below.

In one form, the VDT 102 is configured to comply with a vehicle diagnosis protocol, such as International Standard Organization (ISO) standard ISO-14229, that specifies data link requirements of diagnostic services between the VDT 102 and the ECM 108.

Figure 2:
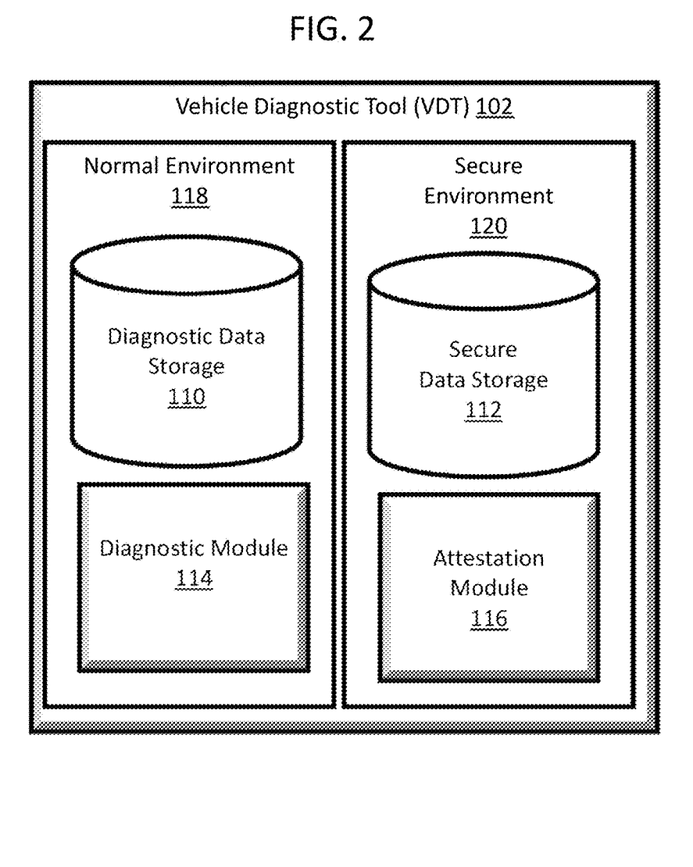
FIG. 2 is a block diagram of a vehicle diagnostic tools (VDT) according to the present disclosure.

Referring now to FIG. 2, the VDT 102 may include a vehicle diagnostic tester or data-logger or other suitable diagnostics machine. The VDT 102 includes a diagnostic data storage 110, a secure data storage 112, a diagnostic module 114, and an attestation module 116. The VDT 102 is also partitioned to include a normal environment 118 and a secure environment 120. Located within the normal environment 118 is the diagnostic data storage 110 and the diagnostic module 114. The diagnostic data storage 110 is configured to store a plurality of service identifiers (SIDs) and instructions associated with a corresponding service application for execution. Each SID corresponds to a diagnostic service performed by the VDT. In one form, the SIDs are split between request SIDs and response SIDs. For example, the services of the SIDs may include diagnostic session control, ECM reset, Security Access, Authentication, Read Data, Read Memory by Address, Read DTC Information, and the like.

The secure data storage 112 is provided in the secure environment 120. The secure environment 120 is a trusted execution environment (TEE) that is configured to protect code and data loaded inside of it regarding confidentiality and integrity. This prevents unauthorized entities from outside of the TEE from altering data, while code integrity prevents code in the TEE from being replaced or modified by unauthorized entities. Also located within the TEE is the attestation module 116. The attestation module 116 will be further discussed later.

Figure 3:
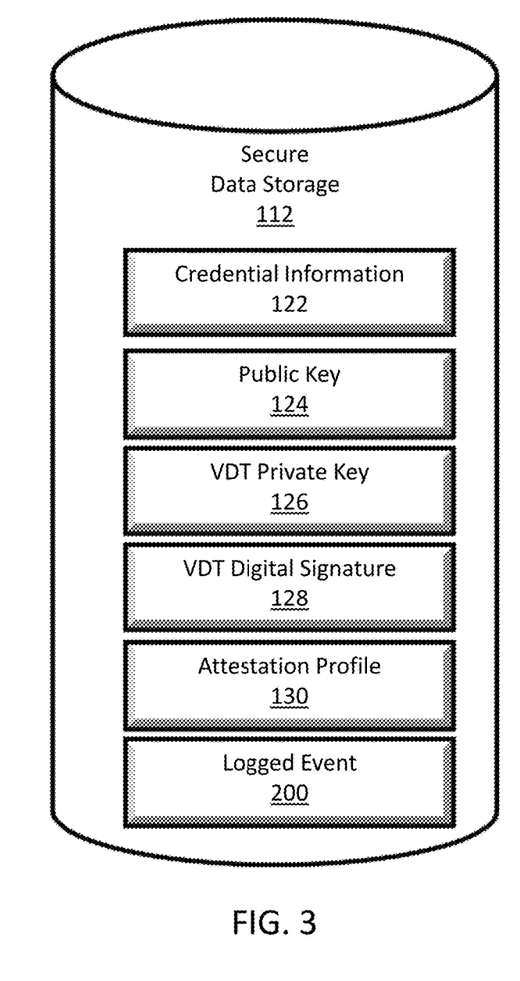
FIG. 3 is a block diagram of a secure data storage of the VDT of FIG. 2 according to the present disclosure.

As shown in FIG. 3, the secure data storage 112 is configured to store a credential information 122, a public key 124, a VDT private key 126, a VDT digital signature 128, and an attestation profile 130. The credential information 122 is a digital certificate configured to provide a type of authentication indicating that an identification and other attributes of the VDT 102, as vouched for by a certification issued by a certification authority, can be trusted as a reliable source. In some forms, the credential information 122 includes a public key certificate. In at least one form, the credential information 122 includes pre-shared symmetric key cryptography. As a result, an original equipment manufacturer (OEM) ensures that the VDT 102 is the entity that it is purported to or supposed to be. The credential information 122 may be obtained directly or indirectly from a certification authority, such as the OEM of the component. Along with the credential information 122, the certification authority also provides that the vehicle 104 and the VDT 102 are associated with the public key 124. The credential information 122 also certifies whether the VDT 102 has an identifying attribute, such as a serial number provided by an OEM or another attribute, associated with the public key 124.

The credential information 122 is configured to include the public key 124, identification data (not shown) related to a role of the VDT 102, a digital signature 128 of a respective OEM that verifies the contents of the credential information 122, and the attestation profile 130. The identification data is set to identify the role of the VDT 102 as a vehicle diagnostic device. In other examples the VDT 102 may identify as one of a plurality of roles of other electronic devices such as a supplier device, a development device, an after-sales device, another vehicle diagnostic device, an electronic Periodic Technical Inspection (ePTI) device and the like. The credential information 122 may also include data related to one or more dates of issue of the credential information 122 by the certification authority and/or additional content.

The public key 124 is a cryptographic key that is obtained and used by anyone to encrypt messages intended for the vehicle 104, such that the encrypted messages can be deciphered only using a second key, a private key that is only known by the vehicle 104. The VDT private key 126 is a secret key (i.e., the VDT private key 126) that is known only to the VDT 102 and is a variable cryptographic key that is used with an algorithm to encrypt and decrypt data. The VDT digital signature 128 is a cryptographic value that is calculated based on the public key certificate 122 and a private key 126.

Figure 4:
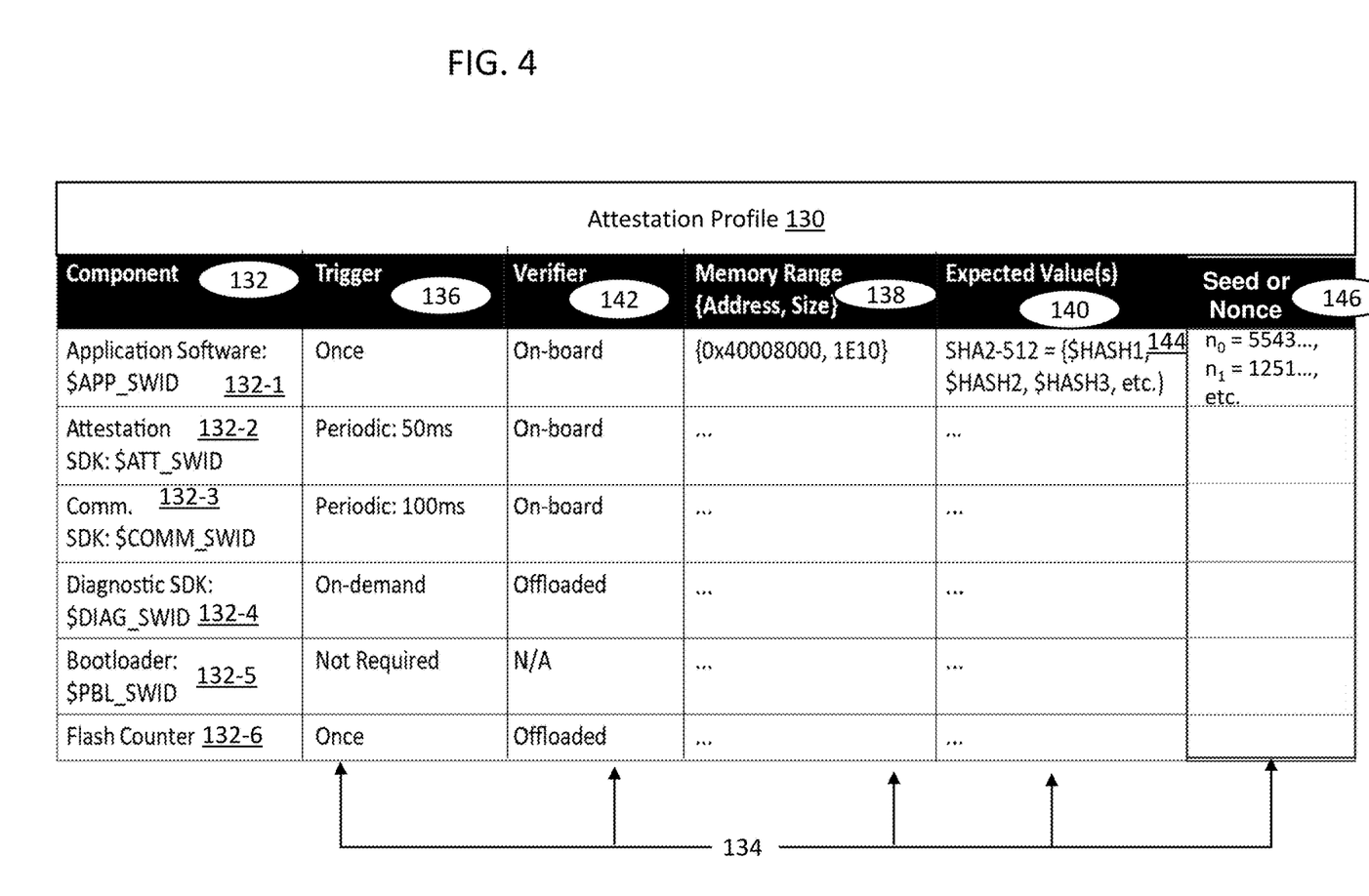
FIG. 4 is an example of an attestation profile according to the present disclosure.

FIG. 4 provides an illustration of an example of the attestation profile 130 as provided herein. The attestation profile 130 is a trusted mechanism that allows the VDT 102 and/or the ECM 108 to communicate with each other to continuously and independently validate the integrity of each other during an approved session. While this example provides one attestation profile 130, there may be a plurality of attestation profiles (e.g., in the case of a distributed system with multiple ECMs 108 composing a function). The attestation profile 130 includes one or more software components 132 installed to operate one or more aspects of the attestation profile 130. In one form, the attestation profile 130 may be encrypted. In some forms, the attestation profile 130 is encrypted using the public key of the VDT 102, the ECM 108 or a combination thereof. Each software component 132 is associated with one or more parameters 134 that identify one or more rules to govern the operation of a respective software component 132. Together the software components 132 and the parameters 134 describe a software application to operate and their corresponding parameters that define the rules and data for operation for operating the attestation profile 130.

In this example, the software components 132 include the following application software components: an attestation profile program software 132-1 identified by the software identification tag $APP_SWID, an attestation software development kit (SDK) 132-2 identified by the software identification tag $ATT_SWID, a communication SDK 132-3 identified by the software identification tag $COMM_SWID, diagnostic SDK 132-4 identified by the software identification tag $DIAG_SWID, a bootloader 132-5 is identified by the software identification tag $PBL_SWID, and a flash counter 132-6.

Still referring to FIG. 4, each parameter 134 is associated with its respective software component and includes a plurality of preset parameters, such as a trigger parameter 136, a memory range parameter 138, an expected value parameter 140, and a verifier parameter 142. The trigger parameter 136 defines a trigger event that determines when a measurement or check associated with the respective software component 132 should be executed or fired, such as for example, once at diagnostic session initialization, during the session, invoked on demand by the relying party, e.g., prior to a processing a critical command, detection of an anomaly/fault/attack or responding with sensitive information, etc. In other examples, the trigger parameter 136 is configured to execute a corresponding component 132 that is set to periodically (e.g., every 50 ms or 100 ms), On-demand, or Not Required.

The memory range parameter 138 defines an address within the memory range that the component is located. For example, this may be used to allow different versions of system software to successfully perform diagnostic services. In one form, the software component 132 application software 132-1 may be stored at a predetermined memory range of {0x40008000, 1E10}, where 0x40008000 defines the memory address and 1E10 defines an offset/size of the region starting at the memory address. In another form, the memory range parameter 138 may be dynamically set. In another example, the memory range parameter 138 may be defined from a reference of a variable, identifier, or a descriptor such as a being obtained during a runtime from a system register, ROM/e-fuse location, etc.

The expected value parameter 140 includes one or more hash values, corresponding to different versions of acceptable software. In one form, the expected value parameter 140 blocks outdated software versions from support since an outdated system may be vulnerable and untrustworthy. As provided herein, the hash value includes one or more numbers and/or letters that are produced manually by an operator and/or a calculation by an algorithm, such as a hash algorithm) on data such as a file or text. For example, the hash values include one or more identifying files or contents therein. Contents of the files are processed using a cryptographic algorithm and a unique numerical value, i.e., a collision-resistant hash value that ensures the hash value is unique without revealing anything about the original data or its size. The hash values are produced to identify or verify the contents of the file and the integrity of the data contained within the file. If the data is modified, the value of the hash will also change. In this regard, the hash value is calculated in real time to ensure freshness. In this example, the application software component 132: $APP_SWID has an associated expected value parameter 140 of SHA2-512 {$HASH1, $HASH2, $HASH3, etc}. The additional content may include, but is not limited to, a username (e.g., Larry), password, passphrase, symmetric encryption key, public key certificate, data related to a specific use case (e.g., key programming), a vehicle information number (VIN) data, geolocation data, date data, time period data, data stored within one or more platform configuration registers (PCRs), hardware security modules (HSMs), firmware configuration data, and the like. In some forms, the expected value parameter 140 may include a checksum, a hash code, or hashes.

In one form, the parameter 134 also includes one or more seeds or nonce values 146. Each seed or nonce 146 is configured to include an arbitrary, random, or pseudo-random number(s) or symbol(s) that can be used just once in a cryptographic communication between the VDT 102 and the ECM 108 when the expected values 140 are transmitted. In one form, the seed or nonce 146 may include a single character or a string of up to 256 characters that are generated by the VDT 102 and associated with the expected values 140. The seeds or nonces 146 are used by VDT 102 to verify the freshness of an expected value sent by the ECM 108. In one form, one or more seeds or nonces 146 includes a single seed or nonce associated collectively with the expected values 140. In another form, the one or more seeds or nonces 146 include a plurality of seeds or nonces, wherein each expected value 140 is associated with a respective seed or nonce. In this example, the seed or nonce 146 is 5543 at the communication sequence no for the expected value 140 SHA2-512.

The verifier parameter 142 defines whether the VDT 102 or the ECM 108 will provide one or more measurements 144 for the attestation. In one example, the one or more measurements includes an expected value parameter 140 associated with the respective verifier parameter 142 and a respective software component associated with the expected value parameter. In one form, the verifier parameter includes at least two settings such as: on-board diagnostics setting or an off-board diagnostics setting. When the verifier parameter 142 is set to the on-board setting, the ECM 108 is set to create and provide a measurement 144 (or the expected value parameter 140). On the other hand, if the verifier parameter is set to off-board, the VDT will determine the measurement 144 (e.g., the expected value parameter 140) on behalf of the ECM 108. In this example, the VDT does not utilize the measurement of the ECM 108 and memory contents are sent verbatim. In this example, the software component 132 for the application software $APP_SWID is set to trigger once, and a measure calculation will occur on-board or by the ECM 108. In some examples, the verifier parameter 142 may also define the establishment of a secure channel to communicate and receive the measurement 144 in either on-boarding or off-boarding. In one example, a verbatim memory may include sensitive data that can be eavesdropped on by a third-party device, and thus using a secure channel prevents such leakage of sensitive memory contents. The secure channel may include communicating a predetermined or derived secret (e.g., Diffie-Helman key exchange method) between the VDT 102 and the ECM 108 used to encrypt and/or authenticate any measurements 144. On these types of systems, it is possible to offload raw device memory for verification at the relying party.

Referring again to FIG. 2, the diagnostic module 114 is configured to perform one or more of the diagnostic services in communication with the vehicle 104. In this example, the diagnostic module 114 is configured to perform an authentication service with the vehicle 104. The diagnostic module 114 is configured to establish a diagnostic session with an ECM 108 of the vehicle 104. In one form, the diagnostic session may define the type of services that are available for use and corresponds to a specific type of service. The authentication service is configured to provide a secure mechanism through which the VDT 102 is authenticated as a trusted entity to obtain access to secured data stored in secured memory of the ECM 108. Furthermore, this access to the secured data allows the VDT 102 to access inactive vehicle features and functions within the ECM 108. In one form, the authentication unlocks a whole service, a subfunction or access to a specific value stored within the ECM 108.

In this example, the diagnostic module 114 is configured to send a request for a diagnostic session for authentication services (e.g., sending the authentication service code: 0x29). The request includes the service identifier (SID) for authentication services. The diagnostic module 114 is configured to receive an acknowledgment from the ECM 108 along with a response code. In one form, the response code is a positive response code. In another form, the response code is a negative response code. If the diagnostic module 114 receives a positive response code, it means that the ECM 108 received the corresponding request message and execution actions requested by the VDT 102. On the other hand, if the diagnostic module 114 receives a negative response message, it means that the ECM 108 could not execute actions requested by the VDT 102. Based on the negative response message, the diagnostic module 114 may either send another request for authentication or discontinue communication. On the other hand, if the positive response is received, the diagnostic module 114 responds by transmitting the public key certificate containing an attestation profile.

On one hand, the diagnostic module 114 is configured to receive a termination of connection notification if the credential information 122 is determined to be invalid. For example, the credential information 122 may be deemed invalid for one or more of the following reasons: an expiration date has passed or expired, an algorithm is considered obsolete, the credential information 122 appears on a certificate revocation list (CRL), and the like. On the other hand, if the credential information 122 is determined to be valid, the diagnostic module 114 is configured to receive the challenge-response token. In response, the diagnostic module 114 is configured to sign the challenge-response token with the private key. The private key 126 is provided as proof of ownership and indicates that the VDT 102 is a trusted and verified device of the OEM associated with the signature. The diagnostic module 114 then transmits the signed challenge-response token. In one form, the diagnostic module 114 is configured to receive a negative response message to end the session based on a failed validation of the signed challenge-response token. In another form, the diagnostic module 114 is configured to receive a positive response message indicating that the VDT 102 has been authenticated.

Figure 5:
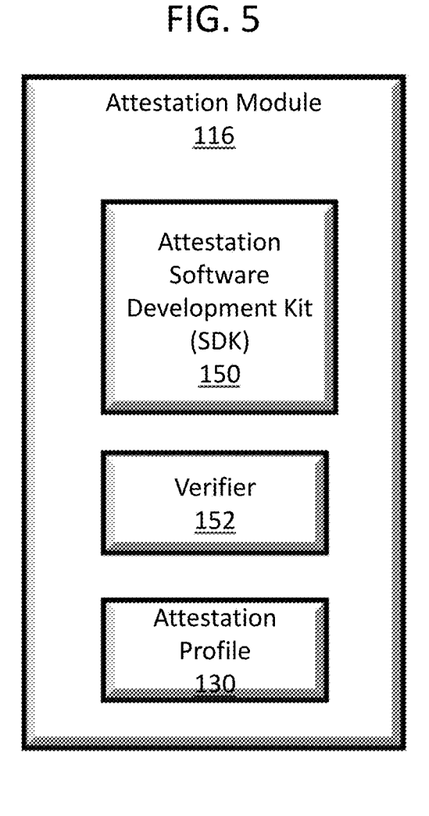
FIG. 5 is an example attestation module of the VDT of FIG. 2 according to the present disclosure.

Referring to FIG. 5, the attestation module 116 may include an attestation software development kit (SDK) 150 that is part of the trusted environment of the VDT 102. The attestation module 116 is configured to provide remote attestation to authenticate the data being received from the ECM 108. In one form, the attestation module 116 includes a verifier 152 configured to check the data received from the ECM 108 and the attestation profile 130. The verifier 152 is also configured to receive one or more received measurements 144 of the target software components 132 of the attestation profile 130 stored in the secure data storage of the ECM 108. Upon receipt of the measurement 144, the verifier 152 is configured to compare the measurement 144 to a measurement of the attestation profile 130. In one form, the received measurement 144 and the measurement of the attestation profile 130 include one or more software components 132 and their respective expected value parameters 140. More specifically, the verifier 152 compares the expected value parameter 140 associated with its respective component 132 received to the expected value parameters 140 associated with its respective component 132 stored in the attestation profile 130 to determine if the expected values are the same. In this example, the verifier 152 authenticates the ECM 108 and/or the diagnostic session based on the determination of whether the hash values are the same. If the respective hash values are the same, then the attestation module 116 is configured to determine that the ECM 108 is an authentic, trusted entity and that the diagnostic session is valid.

In some forms, the attestation module 116 is configured to transmit a measurement 144 of the one or more target software components 132 to the ECM 108 based on the requirements of the attestation profile 130 stored within its secure data storage 172. The attestation module 116 is configured to perform a one-way and/or a bi-directional operation of attestation. For example, with one-way directional operation, the attestation module 116 is configured to only receive and verify the received measurements 144 of the target software components stored in the attestation profile stored in the ECM 108. On the other hand, with bi-directional operation, the attestation module 116 can not only receive and verify but can also transmit its respective measurements 144 of target software components stored within the attestation profile 130 stored in its secure data storage.

Referring again to FIG. 1, the vehicle 104 and the plurality of ECMs will now be discussed in more detail. In addition to the plurality of ECMs 108, the vehicle also includes a communication system 160, and a diagnostic interface 162, such as an on-board diagnostic port (e.g., OBD-II port, etc.) coupled to the communication system 160. The communication system 160 is configured to allow one or more devices, such as the ECMs 108, to communicate with one another or one or more external devices, such as the VDT 102.

In one form, the communication system 160 is configured to enable wired communication via one or more vehicle buses, short range wireless communication (SRWC) using an SRWC chipset, or long range, cellular communication using a cellular chipset. The buses and SRWC equipment may collectively be implemented to enable a vehicle local area network. The vehicle local area network may include a controller area network (CAN), a media-oriented system transfer (MOST), a local interconnection network (LIN), a local area network (LAN), and one or more other connections such as Ethernet and the like. The one or more communication buses may include a communication bus, an infotainment bus, an entertainment bus, and the like. In one form, at least one of the buses is configured as a diagnostic bus to carry diagnostic information stored in and transmitted by the ECMs. In this example, the buses are directly connected to the ECMs. The buses may also be indirectly connected to any one or more ECMs.

Figure 6:
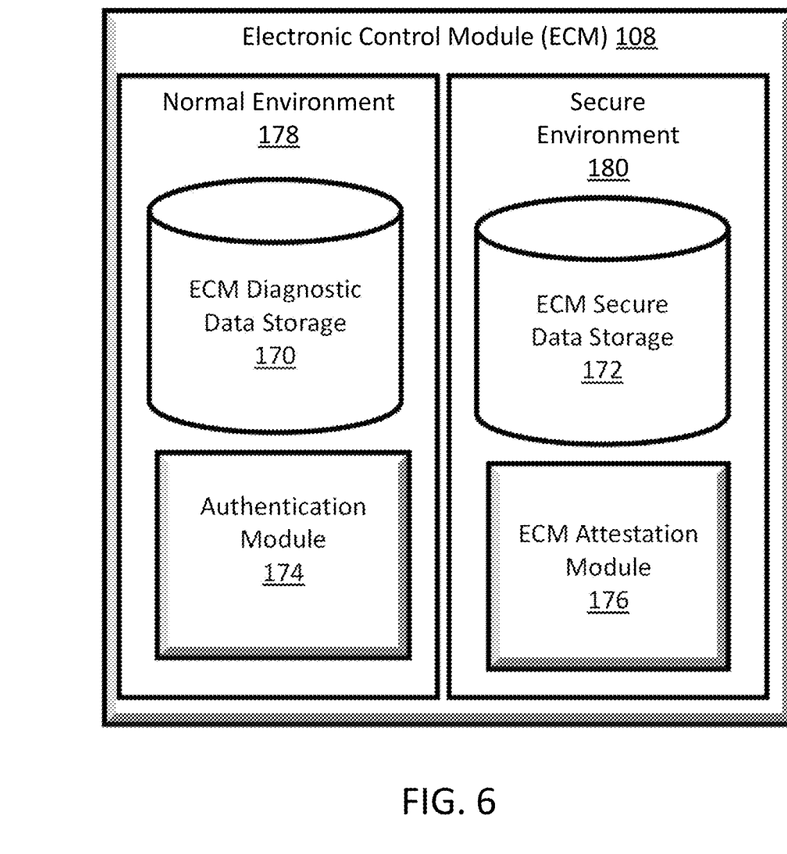
FIG. 6 is an example electronic control module (ECM) according to the present disclosure.

Referring to FIG. 6, an example ECM 108 is provided to illustrate the features and functionality of each of the plurality of the ECMs 108 of the vehicle 104. The ECM 108 includes one or more processing devices or processors and memory or memory devices. The processing devices and the memory are further disclosed below.

The ECM 108 is configured to control one or more functions/features of the vehicle 104 and may be configured according to any suitable standard. For example, the ECM 108 may control electronic fuel injection, automated gear box assemblies, anti-lock braking systems, and the like. In addition, the ECM 108 may abide by and/or comply with a vehicle diagnosis protocol, such as International Standard Organization (ISO) standard ISO-14229, that specifies data link requirements of diagnostic services between the VDT 102 and the ECM 108. Furthermore, the ECM 108 may control a domain, zone, or similar partition of one or more vehicle functionalities or systems.

As shown in FIG. 6, the ECM 108 includes an ECM diagnostic data storage 170, an ECM secure data storage 172, an authentication module 174, and an ECM attestation module 176. Furthermore, ECM 108 is partitioned to include a normal environment 178 and a secure environment 180. The normal environment 178 and the secure environment 180 areas are structured with similar features and functions as the normal and secure environments 118, 120 of the VDT 102 and their descriptions are not repeated here. The ECM diagnostic data storage 170 and the authentication module 174 are partitioned within the normal environment 178. The secure data storage 172 and the attestation module 176 are located within the secure environment 180. While this example provides one example of the partition arrangement of the normal and secure environments 178, 180, it should be understood that these environments may be arranged differently. For example, the ECM diagnostic data storage 170 and/or the authentication module 174 may be partitioned within the secure environment 180.

The ECM diagnostic data storage 170 is configured to store one or more SIDs corresponding to diagnostic services to be performed on the ECM 108. The ECM diagnostic data storage 170 is also configured to store an authentication parameter indicating that the ECM 108 supports a public key certificate exchange.

Figure 7:
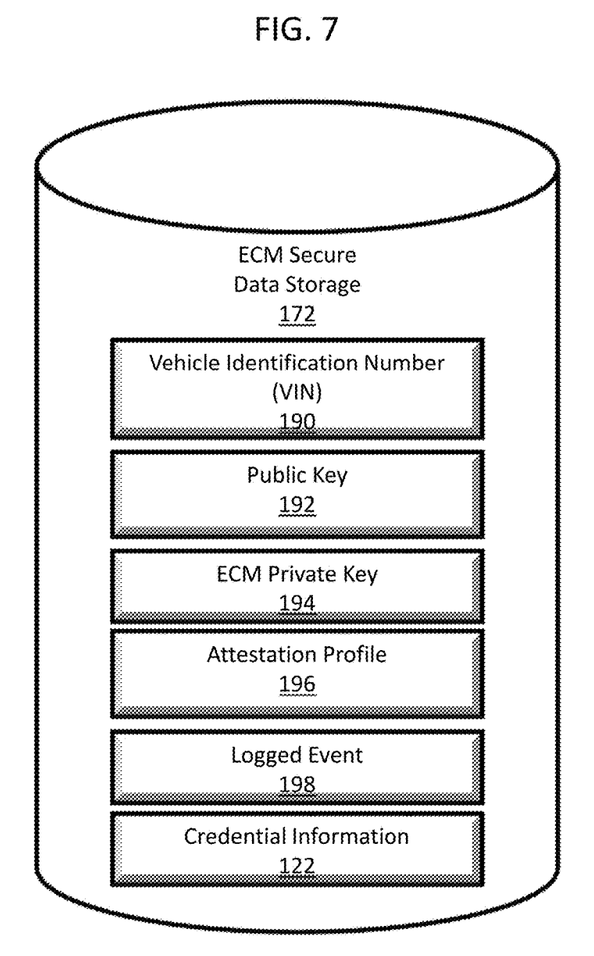
FIG. 7 is a block diagram of a secure data storage of the ECM of FIG. 6 according to the present disclosure.

The ECM secure data storage 172 is configured to store sensitive data associated with communication over the bus and/or sensitive data associated with a respective vehicle module (not shown). For example, as shown in FIG. 7, the ECM secure data storage 172 is configured to store and utilize a vehicle identification number (VIN) 190, an ECM public key 192, an ECM private key 194, and a recorded event (e.g., an attestation failure code) 198. In another form, the ECM secure data storage 172 also stores the attestation profile 196 received from a connecting VDT 102 sent during a diagnostic session. The VIN 190 includes unique alphanumeric characters identifying the vehicle 104. The ECM public key 192 and the ECM private key 194 are similar in features and functions as the public key 124 and the private key 126 discussed above and their description is not repeated here. In one form, the logged event 198 includes an attestation failure code and the attestation failure code is an error code indicative of a failed attestation event. The secure data storage 172 may also store the credential information 122 received from the VDT 102.

The authentication module 174 is configured to authenticate a connecting VDT 102 as a trusted entity prior to providing the VDT 102 access to secure data to modify one or more features and/or functions of the ECM 108. The authentication module 174 is configured to receive a request for diagnostic service with authentication. Upon receipt, the authentication module 174 is configured to transmit an acknowledgement message and the authentication parameter. In one form, the authentication parameter indicates that authentication is not supported on this module. In this example, the authentication module 174 sets the authentication parameter to indicate that authentication is supported on the ECM 108.

The authentication module 174 is configured to receive the public key certificate from the VDT along with the attestation profile. The authentication module 174 stores the attestation profile into the ECM secure data storage 172. While in this example the ECM 108 receives the attestation profile 130 from the VDT 102, the ECM 108 can also be configured to transmit the attestation profile 130 to the VDT 102 during or after the authentication of the VDT 102.

The authentication module 174 is configured to verify that the credential information 122 is valid by checking its respective OEM signature and/or a chain of trust (e.g., an ordered list of certificates containing an end-user certificate and any intermediate certificates). The chain of trust enables the ECM 108 to verify that the sender (e.g., VDT 102) and all intermediate certificates are trustworthy. After validating the public key certificate, the authentication module 174 is configured to store the credential information 122 within the secure data storage 172. Using the digital signature and at least one of the ECM public key 192, the authentication module 174 is further configured to verify that the credential information 122 is valid. Alternatively, the authentication module 174 may also utilize the VDT public key 124 found in the credential information 122 to verify the credential information 122 and verify whether the credential information 122 is valid.

In response to a valid verification, the authentication module 174 transmits a challenge-response token to the VDT 102. The challenge response token may include a nonce or seed and a request to sign the challenge response with the private key 126. On the other hand, if the authentication module 174 determines that the credential information 122 is not valid, the authentication module 174 terminates the diagnostic session with the VDT 102. In some forms, the authentication module 174 is configured to log and/or report an instance of failure and/or a termination of a diagnostic session.

Once the challenge response token is received, the authentication module 174 is configured to verify the signature of the challenge-response token. If valid, the authentication module 174 is further configured to transmit a successful authentication message and unlock secured data to allow the VDT 102 to have access to modify one or more features and/or functions of the ECM 108.

Again referring to FIG. 6, the attestation module 176 operates with similar features and functions to the attestation module 116 of the VDT 102 and the description is not repeated here.

Figure 8:
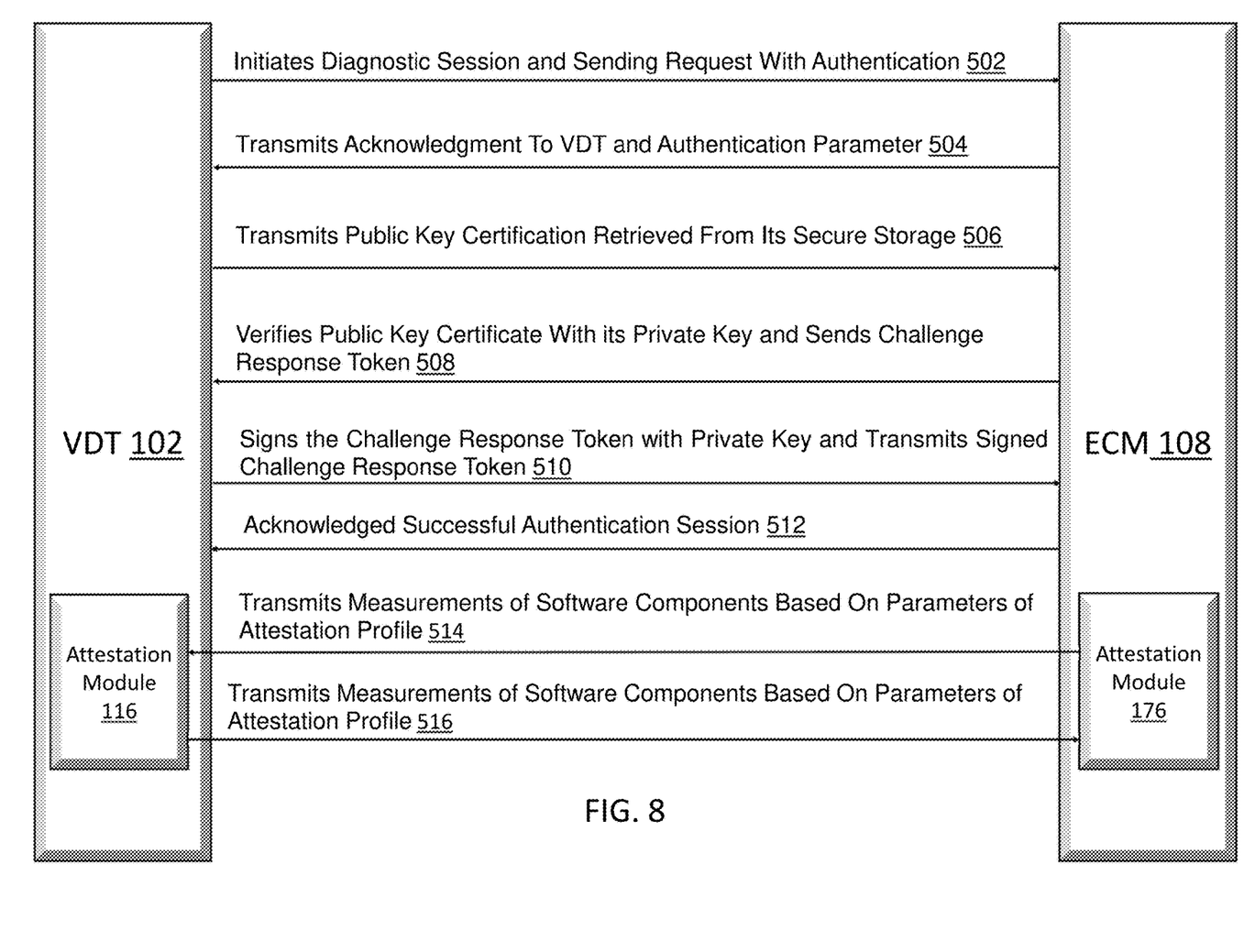
FIG. 8 is an illustrative example of a communication exchange between a VDT and an ECM according to the present disclosure.

Now referring to FIG. 8, a sequence diagram for a diagnostic service with a remote attestation stored with an ECM 108 and a VDT 102 according to the teachings of the present disclosure. This sequence diagram illustrates a bi-directional operation of attestation between a VDT 102 and an ECM 108.

At 502, the VDT 102 initiates a diagnostic session by sending a request for authentication to the ECM 108. At 504, in response, the ECM 108 transmits an acknowledgment to the VDT 102 and an authentication parameter. In response, the VDT 102 transmits a credential information 122 retrieved from its secure data storage 112 at 506. The credential information 122 includes an attestation profile

130. Upon receipt, the ECM 108 stores a received attestation profile 196 within its respective secure data storage 172.

At 508, the ECM 108 verifies the credential information 122 with its private key 194 and sends a challenge response token. The VDT 102 responds to the challenge response token and signs it with a private key 126.

At 510, the VDT 102 transmits, to the ECM 108, a signed challenge response token. The ECM 108 receives the signed challenge response token and determines whether the received signed challenge response token created using the ECM private key 194 is validated and the challenge response token within the signed payload matches the challenge response token generated by the VDT 102. If the received signed challenge response token is validated and the challenge response token matches the challenge response token generated by the VDT 102, the ECM 108 acknowledges successful security access session at 512. In this example, the received signed response token is validated as determined by using the public key 192 of the ECM 108 to verify (i.e., decrypt) the signed challenge response token transmitted by the ECM 108. If the received signed challenge response token is not validated, then the ECM 108 terminates the diagnostic session.

To maintain the diagnostic session, the ECM 108 transmits one or more measurements 144 (e.g., one or more expected values 140) of one or more software components 132 based on one or more of its respective parameters 134 of the attestation profile 196 at 514. In one form, prior to transmission, the ECM 108 combines the measurements 144 with the nonce or a seed 146 provided by the VDT 102 associated with the attestation profile 130 to ensure freshness. Once received, the VDT 102 verifies freshness of the received measurements 144 using the generated seed or nonce and verifies whether a received measurement 144 of the at least one of the one or more software components 132 and the one or more parameters 134 is valid based on requirements found in its respective attestation profile 130. For example, the ECM 108 transmits an expected value of SHA2-512 for component SDK: $ATT_SWID every 50 ms and performs the measurement based on the verifier parameter set to on-board. Upon receipt, the VDT 102 verifies whether the data received is valid by comparing it to the data stored within its attestation profile 196.

At 516, likewise, the VDT 102 transmits one or more measurements 144 (e.g., one or more expected values 140) of the software components 132 based on the parameters 134 of the attestation profile 130 at 514. In one form, prior to transmitting the measurements 144, the VDT 102 combines the measurements 144 with a generated seed or nonce to ensure freshness. Using the seed or nonce 146, the ECM 108 verifies the freshness of the received measurements 144. The ECM 108 verifies whether a received measurement 144 of the at least one of the one or more software components 132 and the one or more parameters 134 is valid based on requirements found in the ECM 108, within its respective attestation profile 196. In this example, the VDT 102 transmits an expected value of SHA2-512 for a software component SDK: $COMM_SWD every 100 ms and performs the measurement 144 on-board. Upon receipt, the ECM 108 verifies whether the data received is valid by comparing it to the data stored within its attestation profile 196.

If the attestation process for the ECM 108 and/or VDT 102 fails for any reason, the diagnostic session is terminated. In addition to terminating the diagnostic session, the ECM 108 logs an event 198 such as setting an attestation failure code (e.g., diagnostic trouble code (DTC)) and stores it in the secure data storage 172. Likewise, if a diagnostic session is terminated based on a failed attestation process, the VDT 102 securely logs the event in a trusted secure data storage 112 along with ancillary event data and/or transmits the events as a qualified security event (Sev) to a designated collector (not shown). The designated collector may include an intrusion detection system manager (IDSM) that is located remotely outside of the vehicle 104, within the vehicle 104 or a combination thereof. Otherwise, if the ECM 108 or VDT 102 determines that the measurement 144 is valid, the diagnostic session continues until the diagnostic session is terminated by either the VDT 102 or the ECM 108.

Figure 9:
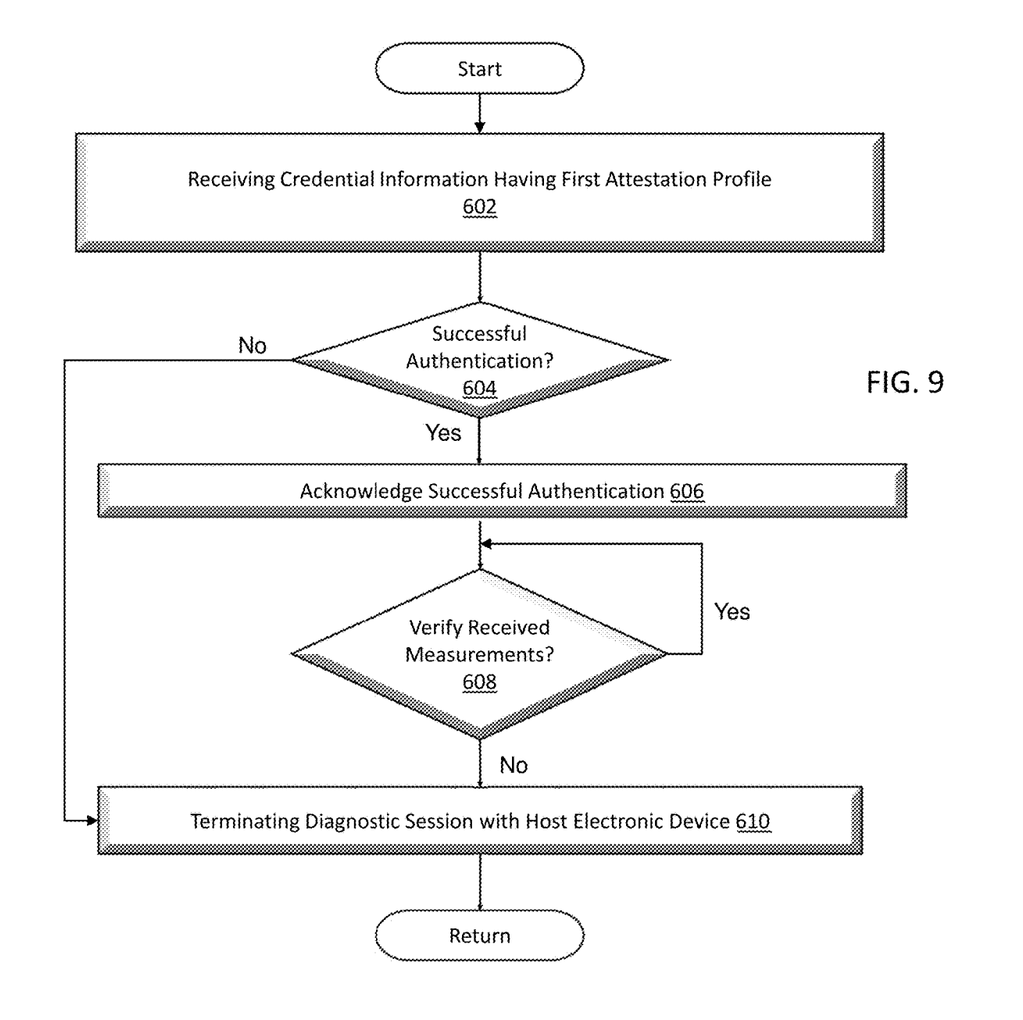
FIG. 9 is a flow chart of a first example method for remote attestation of a host electronic device in communication with a vehicle according to the present disclosure.

Now referring to FIG. 9, a method 600 of authenticating a host electronic device in communication with a vehicle is provided. At step 602, the ECM 108 receives, from the VDT 102, credential information to authenticate an identification of VDT 102 to establish a diagnostic session, prior to allowing access to secure data to control one or more functions of a vehicle. The credential information 122 includes an attestation profile 130. Upon receipt, the ECM 108 stores a received attestation profile 196 within its respective secure data storage 172. The attestation profile defines at least one of one or more software components and one or more parameters associated with the one or more software components to be used to provide an attestation of the ECM 108 in communication with the VDT 102 to maintain the diagnostic session. In response, the ECM 108 transmits an acknowledgment to the VDT 102 and an authentication parameter.

At step 604, the ECM 108 determines whether a successful authentication has occurred based on the credential information 122 received. Specifically, the ECM 108 verifies the credential information 122 with its private key 194 and sends a challenge response token. In response, the ECM 108 receives a signed challenge response token, from the VDT 102, which has been signed with a private key 126 of the VDT 102, and verifies (i.e., decrypts) the authenticity of the signature associated with the signed challenge response token. If the authentication is successful, then proceed to step 606. If authentication is not successful, then proceed to step 610.

At step 606, the ECM 108 acknowledges successful security access session at 512 and proceeds to step 608. The acknowledgement of the successful security access session is used to establish the diagnostic session between the ECM 108 and the VDT 102. In return, the ECM 108 receives, from the VDT 102, one or more measurement values corresponding to one or more measurement values associated with the one or more software components of the attestation profile. If yes, then proceed to step 608. If no, then proceed to step 610.

At step 608, the ECM 108 verifies whether the received measurement values (e.g., the expected values 140) of the at least one of the one or more software components and the one or more parameters of the first attestation profile are valid. This verification allows the ECM 108 to determine whether the attestation between the ECM 108 and the VDT 102 is valid or has failed. To maintain the diagnostic session, the ECM 108 receives one or more measurements 144 of the software components 132 based on the parameters 134 of the attestation profile 130. The ECM 108 verifies whether a received measurement 144 of the at least one of the one or more software components 132 and the one or more parameters 134 is valid based on requirements found in the ECM 108 and its respective attestation profile 196. In this example, the ECM 108 receives an expected value of SHA2-512 for a software component SDK: $COMM_SWD every 100 ms and performs the measurement 144 on-board. Upon receipt, the ECM 108 verifies whether the data received is valid by comparing it to the data stored within its attestation profile 196. For example, if the received measured value is not equal to the stored measured value in the attestation profile 196, then the attestation has failed and is not valid. On the other hand, if the received measured value is equal to the stored measured value in the attestation profile 196, then the attestation is successful and is valid. Thus, if no, proceed to 610; if yes, proceed to 608.

At step 610, the ECM 108 terminates the diagnostic session with the VDT 102. In addition to terminating the diagnostic session, the ECM 108 logs an event 198 such as setting an attestation failure code (e.g., diagnostic trouble code (DTC)) and stores it in the secure data storage 172. Otherwise, if the ECM 108 determines that the measurement 144 is valid, the diagnostic session continues until the diagnostic session is terminated by either the VDT 102 or the ECM 108. While each of the steps of the example method 600 above have been executed by the ECM 108, it should be noted that each of the steps may also be executed by the VDT 102, in combination with the ECM 108 or alone, having similar features and functions.

Figure 10:
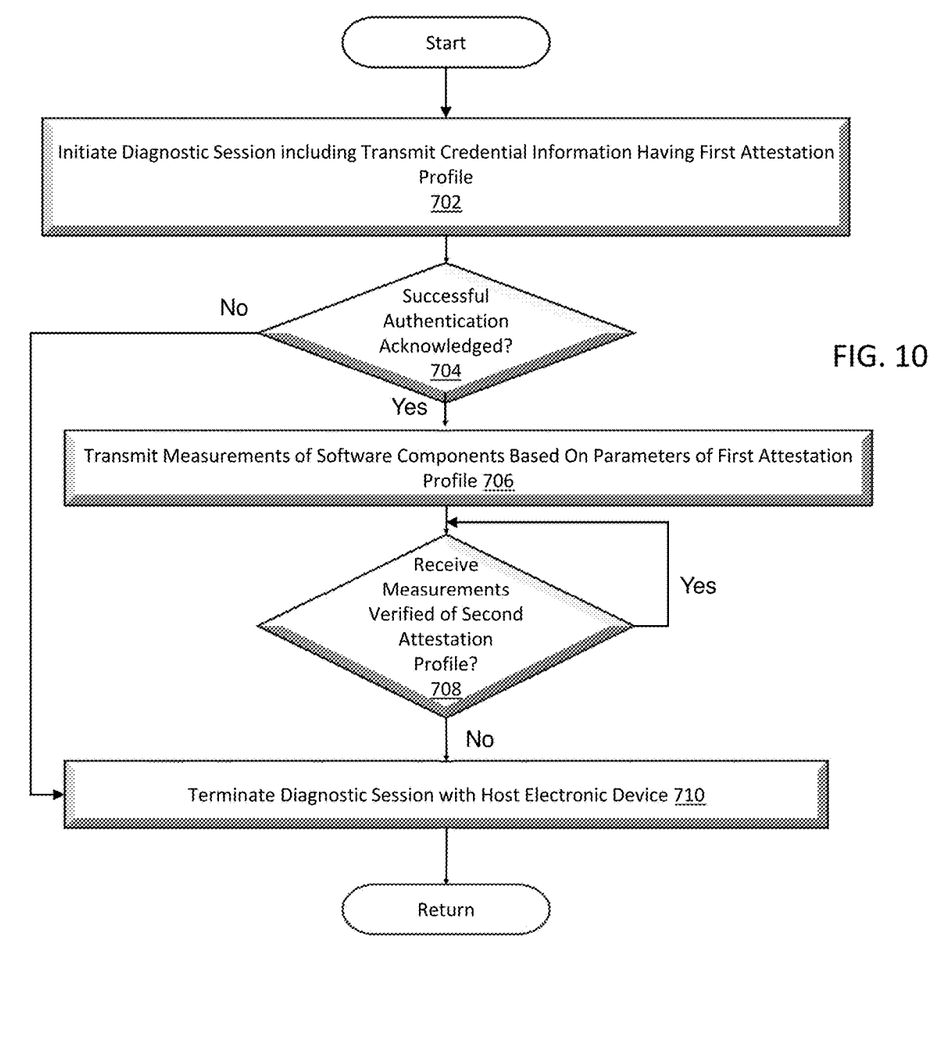
FIG. 10 is a flow chart of a second example method of remote attestation of an electronic control module of a vehicle in communication with a VDT according to the present disclosure.

Now referring to FIG. 10, a method 700 of authenticating an electronic control module of a vehicle in communication with a VDT is provided. At step 702, the VDT 102 initiates a diagnostic session with an ECM 108. The initiation includes transmitting credential information to authenticate an identification of VDT 102 to establish a diagnostic session, prior to allowing access to secure data to control one or more functions of a vehicle. The credential information 122 includes the first attestation profile 130, wherein the first attestation profile 130 is stored within a trusted, secured environment of the ECM secure data storage 172. For the sake of clarity, the second attestation profile 130 stored within the ECM 108 has been referred to as a second attestation profile 196. The attestation profile 196 defines at least one of one or more software components and one or more parameters associated with the one or more software components to be used to provide an attestation of the ECM 108 in communication with the VDT 102 to maintain the diagnostic session. In response, the VDT 102 receives an acknowledgment for a successful authentication and an authentication parameter.

At step 704, the VDT 102 determines whether a successful authentication has been acknowledged based on the received acknowledgement for the successful authentication. If the acknowledgement has been received then, then proceed to step 706. If the acknowledgement has not been received, then proceed to step 710.

At 706, the VDT 102 transmits one or more measurements 144 (e.g., one or more expected values 140) of the software components 132 based on the parameters 134 of the first attestation profile 130 stored in the secure data storage 112. In one form, prior to transmitting the measurements 144, the VDT 102 combines the measurements 144 with a generated seed or nonce to encrypt the measurements 144. In this example, the VDT 102 transmits an expected value of SHA2-512 for a software component SDK: $COMM_SWD every 100 ms and performs the measurement 144 on-board.

At step 708, the VDT 102 also verifies whether a received measurement values (e.g., one or more expected values 140) of the at least one of the one or more software components and the one or more parameters of the second attestation profile 196 are valid. This verification allows the VDT 102 to determine whether the attestation between the ECM 108 and the VDT 102 is valid or has failed. To maintain the diagnostic session, the VDT 102 receives one or more measurements 144 of the software components 132 based on the parameters 134 of the second attestation profile 196 stored within the ECM 108. The VDT 102 verifies whether a received measurement 144 of the at least one of the one or more software components 132 and the one or more parameters 134 is valid based on requirements found in the VDT 102 and its respective attestation profile 130. In this example, the VDT 102 receives an expected value of SHA2-512 for a software component SDK: $COMM_SWD every 100 ms and performs the measurement 144 on-board. Upon receipt, the VDT 102 verifies whether the data received is valid by comparing it to the data stored within its attestation profile 130. For example, if the received measured value is not equal to the stored measured value in the attestation profile 130, then the attestation has failed and is not valid. On the other hand, if the received measured value is equal to the stored measured value in the attestation profile 130, then the attestation is successful and is valid. Thus, if no, proceed to 710; if yes, proceed to 708.

At step 710, the VDT 102 terminates the diagnostic session with the ECM 108. In addition to terminating the diagnostic session, the VDT 102 logs an event 200 such as setting an attestation failure code (e.g., diagnostic trouble code (DTC)) and stores it in the secure data storage 112. Otherwise, if the VDT 102 determines that the measurement 144 is valid, the diagnostic session continues until the diagnostic session is terminated by either the VDT 102 or the ECM 108. While each of the steps of the example method 700 above have been executed by the VDT 102, it should be noted that each of the steps may also be executed by the ECM 108, in combination with the VDT 102 or alone, having similar features and functions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Each processor includes any type of device capable of processing electronic instructions including microprocessors, microcontrollers, host processors, controllers, vehicle communication processors, field programmable gate arrays (FPGAs), complex programmable logic device (CPLDs), and application specific integrated circuits (ASICs). The processor executes various types of digitally-stored instructions, such as software or firmware programs stored in memory, which enable a vehicle module (not shown) to provide various services, functions and/or features. In one form, the VDT 102 and/or the ECM 108 may utilize a hypervisor, partition manager, or similar isolation primitive which may include, but is not limited to, unikernels, containers, confidential virtual machines, and operating system sandboxes to implement the system described herein.

The memory may include any suitable computer usable or readable medium, which includes one or more storage devices or articles. Exemplary computer usable storage devices induce conventional computer system RAM (random access memory), ROM (read only memory) EPROM (erasable, programmable ROM), EEPROM (electrically erasable, programmable ROM) and magnetic or optical disks or tapes. According to one or more forms, the memory may be categorized or divided into identifiable segments carrying or storing diagnostic data or diagnostic services, where each segment has or being associated with a cell or address. At least some of the addresses may store sensitive or confidential information relating to the vehicle's operation, one or more users, and/or diagnostic data and/or services.

Spatial and functional relationships between elements (for example, between modules, circuit elements, semiconductor layers, etc.) are described using various terms, including "connected," "engaged." "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

What is claimed is:

1. A method of authenticating a host electronic device in communication with a vehicle, the method including:
   receiving, from the host electronic device, credential information to authenticate an identification of the host electronic device to establish a diagnostic session, prior to allowing access to secure data to control one or more functions of a vehicle, wherein the credential information includes a first attestation profile and the first attestation profile defines at least one of one or more software components and one or more parameters associated with the one or more software components to be used to provide an attestation of a client device of the vehicle in communication with the host electronic device to maintain the diagnostic session;
   verifying whether a received measurement of the at least one of the one or more software components and the one or more parameters of the first attestation profile is valid, wherein the received measurement is transmitted by the host electronic device that has been authenticated; and
   terminating the diagnostic session with the host electronic device based on a failed validation of the received measurement.

2. The method of claim 1, wherein the verifying is performed in a trusted execution environment.

3. The method of claim 1, further comprising receiving a request to start the diagnostic session with authentication.

4. The method of claim 1, further comprising:
   verifying whether the credential information is valid; and
   transmitting a challenge-response token that asks the host electronic device to sign the challenge-response token with a private key certificate that identifies its issuer.

5. The method of claim 4, further comprising issuing an acknowledgment of establishing a successful authentication for the diagnostic session based on a valid signature of the private key certificate.

6. The method of claim 1, wherein verifying whether a received measurement having the at least one of the one or more software components and the one or more parameters of the first attestation profile is valid includes determining whether the received measurement is valid based on a second attestation profile stored in the host electronic device and the second attestation profile having an identical copy of the at least one of one or more software component and the one or more parameters corresponding to the identical copy of the one or more software components.

7. The method of claim 6, wherein the one or more parameters includes at least one of:
   a trigger parameter that defines when to perform a measurement of the at least the one or more software components and the one or more parameters;
   a verifier parameter that defines whether the measurement occurs in the host electronic device or the client device of the vehicle;
   a memory range parameter that defines a memory range including an address and an offset/size of a region starting at the address; and
   an expected value parameter that includes one or more values that correspond to different versions of acceptable software.

8. The method of claim 1, further comprising logging an event based on a termination of the diagnostic session due to the received measurement being verified as invalid.

9. The method of claim 1, wherein the credential information further includes a public key and a digital signature of a certificate authority.

10. The method of claim 1, wherein the received measurement includes one or more parameters to provide continuous authentication of a previously authenticated component to provide communication.

11. The method of claim 1, wherein the received measurement has been encrypted by the host electronic device and the method further includes verifying the received measurement using at least one of a seed or a nonce associated with the first attestation profile.

12. An electronic control module of a vehicle, the electronic control module comprising:
a processor; and
one or more non-volatile memory devices configured to store instructions executed by the processor, wherein the instructions, when executed, configure the processor to perform:
receiving, from a host electronic device in communication with the electronic control module for a diagnostic session, a credential information to authenticate an identification of the host electronic device prior to allowing access to secure data to control one or more functions of the vehicle, wherein the credential information includes a first attestation profile and the first attestation profile defines at least one of one or more components and one or more parameters associated with the one or more components to be used to provide an attestation of the host electronic device during the diagnostic session after the host electronic device has been authenticated;
verifying whether a received measurement for at least one of the one or more software components and one or more identified parameters of the first attestation profile is valid; and
terminating the diagnostic session with the host electronic device based on a failed validation of the received measurement.

13. The electronic control module of claim 12, wherein the received measurement includes one or more parameters to provide continuous attestation with the host electronic device that has been authenticated.

14. The electronic control module of claim 12, wherein the received measurement includes a software identification tag identifying a software component of the one or more software components and an expected value associated with the software identification tag for attestation of the electronic control module.

15. The electronic control module of claim 12, wherein the verifying is performed in a trusted execution environment.

16. The electronic control module of claim 12, wherein the first attestation profile further includes one or more attestation requirements, and the instructions further configure the processor to perform transmitting a measurement of at least one software component of the one or more software components and/or at least one of a parameter of the one or more parameters of the first attestation profile based on the one or more attestation requirements.

17. A vehicle diagnostic tool with remote attestation-ce, the vehicle diagnostic tool comprising:
a processor; and
one or more non-transitory computer-readable medium comprising instructions that, when executed by the processor, cause the processor to perform:
transmitting, to an electronic control module of a vehicle in communication with the vehicle diagnostic tool, a request for a diagnostic session, wherein the request includes credential information to authenticate an identification of the vehicle diagnostic tool, wherein the credential information includes a first attestation profile and the first attestation profile defines at least one of one or more components and parameters associated with the one or more components to be used to provide an attestation during the diagnostic session after the vehicle diagnostic tool has been authenticated, where the first attestation profile is stored in a trusted execution environment of the electronic control module and the first attestation profile stored in the electronic control module shall now be referred to as a second attestation profile;
verifying whether a received measurement having the at least one of the one or more components and the one or more parameters of the second attestation profile is valid; and
terminating the diagnostic session with the electronic control module based on a failed validation of the received measurement for attestation of the electronic control module in communication with the vehicle diagnostic tool.

18. The vehicle diagnostic tool of claim 17, wherein verifying whether the received measurement of the at least one of the one or more components and the one or more parameters of the second attestation profile are valid comprises determining whether the received measurement is based on a measurement of the first attestation profile that is stored in a trusted execution environment of the vehicle diagnostic tool.

19. The system of claim 17, wherein the received measurement includes one or more parameters to provide continuous attestation of the electronic control module that allows the diagnostic session to continue being active.

20. The system of claim 17, wherein the one or more parameters includes at least one of a trigger value, a verifier, a memory range, and at least one expected value.

* * * * *